May 31, 1938. J. E. OWEN ET AL 2,119,139
LOADING DEVICE
Filed Aug. 24, 1937   3 Sheets-Sheet 3
Fig. 3.
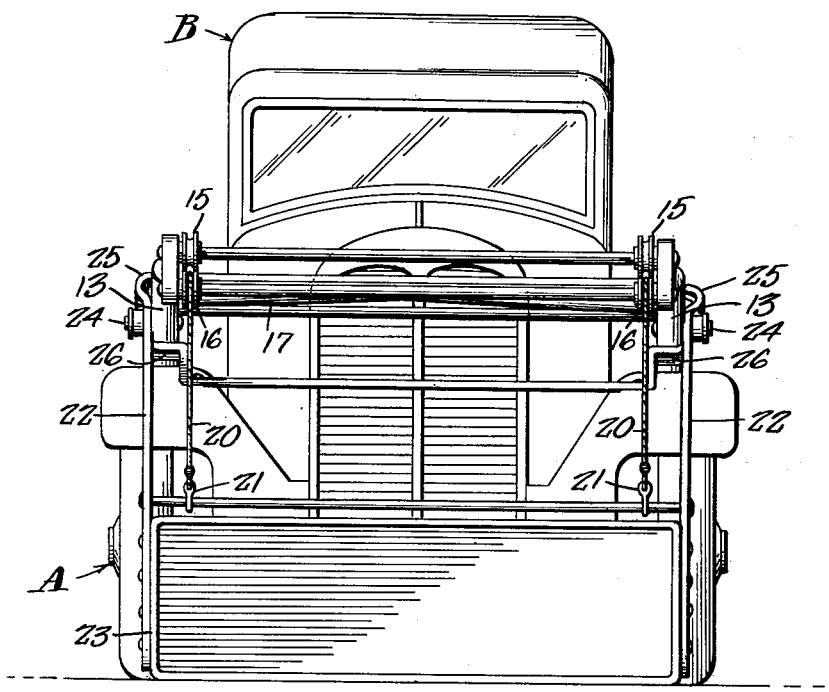
Fig. 4.
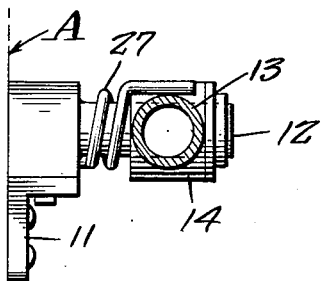
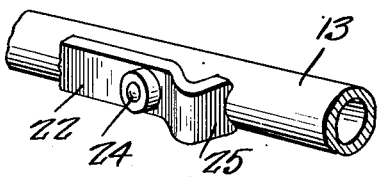
Fig. 5.
James E. Owen,
George W. Bryson,
INVENTORS
BY Victor J. Evans & Co.
ATTORNEYS
WITNESS Patented May 31, 1938

2,119,139

UNITED STATES PATENT OFFICE 2,119,139

LOADING DEVICE

James Edward Owen and George Walter Bryson, Asheville, N. C., assignors to American Devices, Incorporated Application August 24, 1937, Serial No. 160,678

3 Claims. (Cl. 214—78)

The invention relates to a loading device and more especially to a loading attachment for motor trucks.

The primary object of the invention is the provision of a device or attachment of this character, wherein material will be loaded into the truck at the front end thereof and the shovel or other carrier for the load is supported for vertical swinging movement overhead with respect to the driver's cab of the truck and the power for the operation is had from the motor of the said truck.

Another object of the invention is the provision of a device or attachment of this character, wherein the same is supported forwardly of a motor truck and when in lowered position will acquire a load from the ground and carry the same upwardly and rearwardly for dumping into the body of the truck, the device or attachment being of novel construction in its entirety requiring minimum power in the operation thereof and is automatic in the working of the same.

A further object of the invention is the provision of a device or attachment of this character, wherein the carrier for the load can be latched in a partially raised position to clear the ground and when in a lower position will acquire a load.

A further object of the invention is the provision of a device or attachment of this character, which is simple in construction, thoroughly reliable and effective in operation, possessed of few parts, strong, durable, readily and easily mounted for use upon a motor truck or the like and inexpensive to manufacture and install.

With these and other objects in view, the invention consists in the features of construction, combination and arrangement of parts as will be hereinafter more fully described, illustrated in the accompanying drawings, which disclose the preferred embodiment of the invention and pointed out in the claims hereunto appended.

In the accompanying drawings:

Figure 1 is a fragmentary side elevation of a motor truck showing the device or attachment constructed in accordance with the invention applied, the device or attachment being shown by full lines in lowered position and by dotted lines in several raised or adjusted positions and the arrows, indicated in this view, being for defining the movement of the said device or attachment for loading purposes.

Figure 3 is a front elevation.

Figure 4 is a fragmentary elevation showing one of the lifting arms in section.

Figure 5 is a fragmentary perspective view of one of the lifting arms and associated latch.

Similar reference characters indicate corresponding parts throughout the several views in the drawings.

Figure 1:
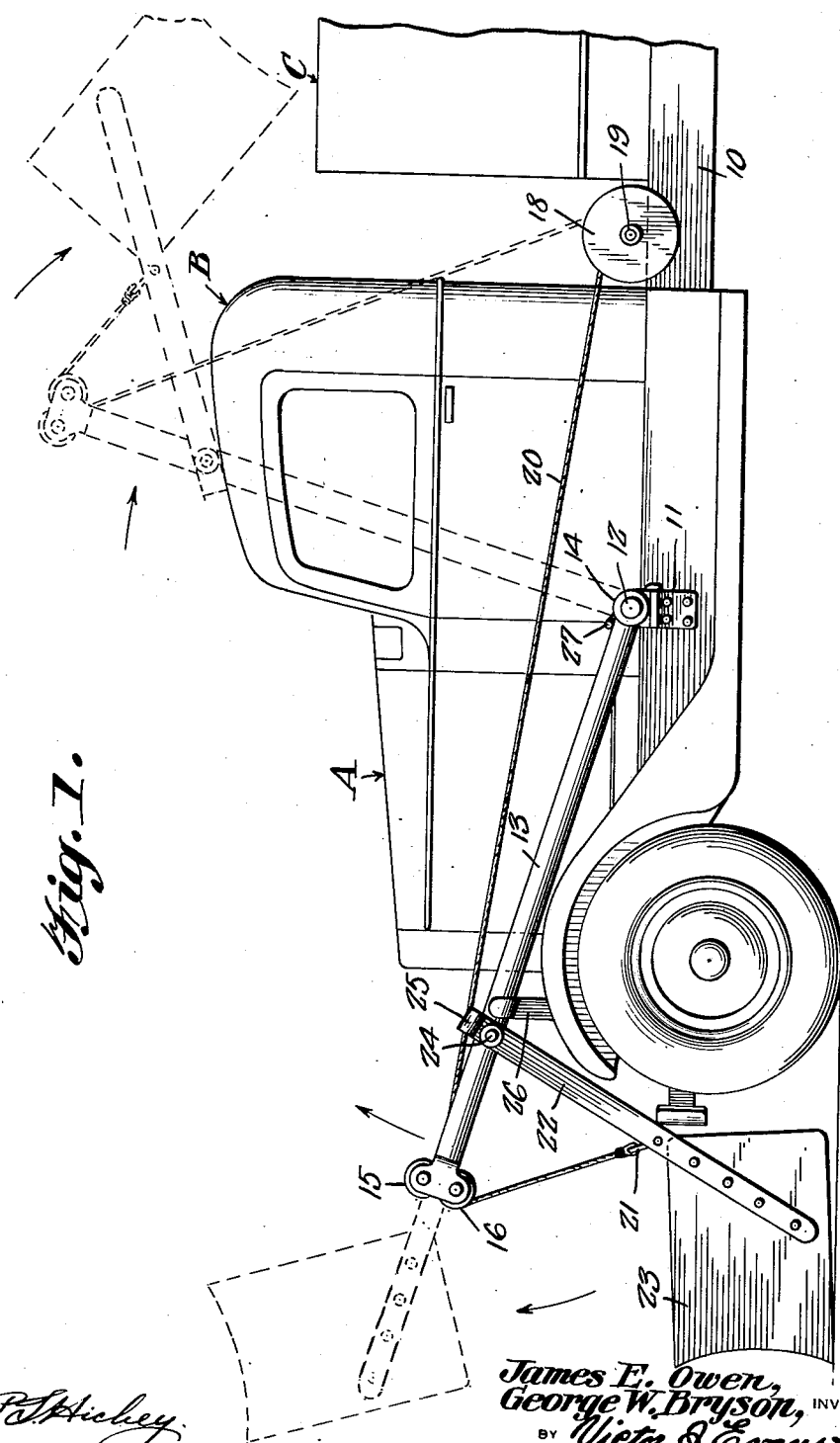
Figure 2:
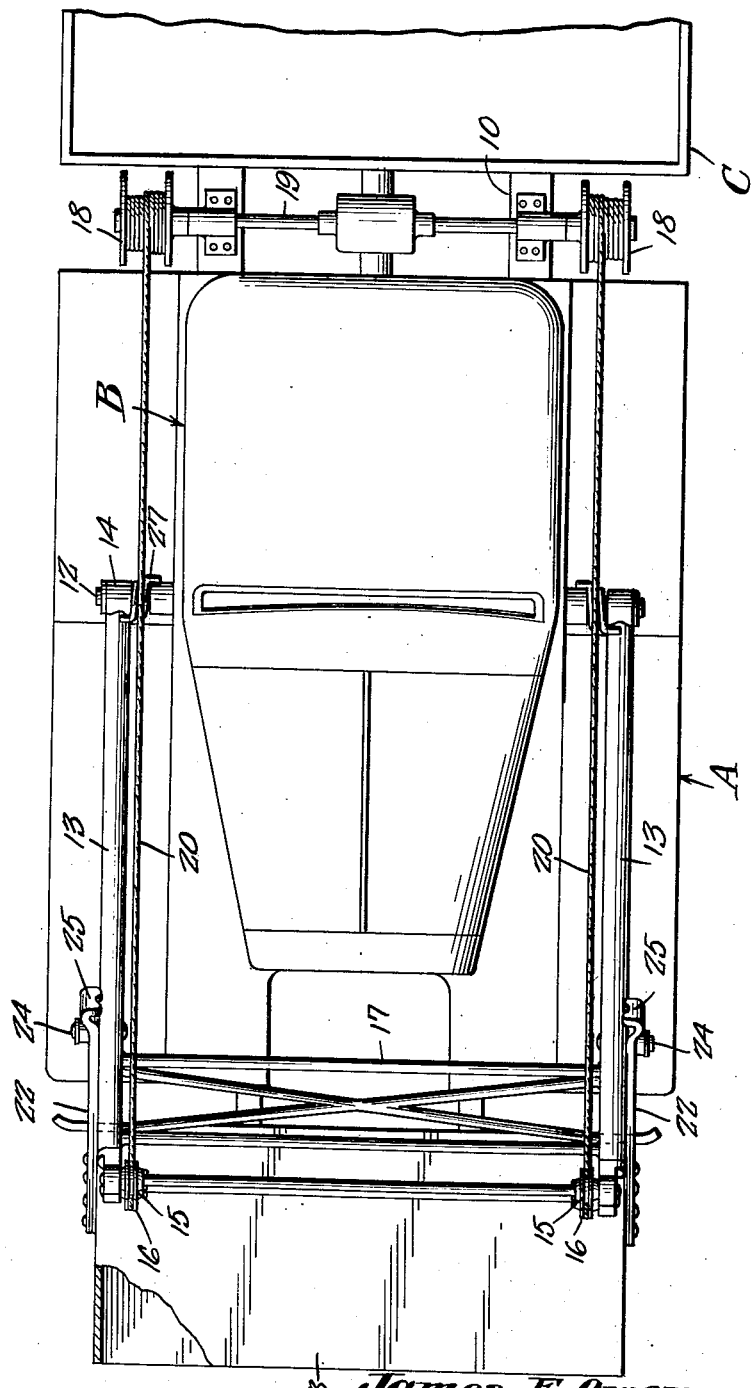
Figure 2 is a top plan view partly in section.

Referring to the drawings in detail, A designates generally a portion of a motor truck, the fore portion thereof equipped with a driver's cab B and as usual a chassis 10 is present. At opposite sides of the chassis 10 and fixed thereto are inverted substantially L-shaped pivot brackets 11, each having projecting outwardly therefrom laterally with respect to the truck stud pivots 12 to which are swingingly fitted the rear ends of lifting arms 13, these rear ends being in the form of hubs 14 while at the forward ends of said arms are upper and lower guide pulleys 15 and 16, respectively. The arms 13 are preferably united with cross braces 17 next to the forward ends thereof to move in unison and rigidly joined with each other. The arms 13 are of a length to extend fore of the truck A the required distance and are adapted for vertical swinging movement.

Immediately rearwardly of the cab B of the truck A and suitably supported upon the chassis 10 is a pair of windlasses or drums 18, these through the driven shaft 19 being operated from the motor (not shown) installed in the motor truck. Adapted to be wound and unwound on and from the windlasses or drums 18 are raising and lowering cables 20 which are passed between the pulleys 15 and 16 which guide the said cables and the latter at their outer ends through couplings 21 are loosely connected to turning levers 22, these being fixed to opposite sides of a shovel, scoop or other load carrier 23, being disposed at an angle thereto and are also pivoted at 24 to the arms 13 at the outer sides thereof at the proper distance rearwardly with respect to the pulleys 15 and 16 so as to have the carrier 23 clear of the latter on swinging thereof. The levers 22 next to the pivots 24 connecting the same with the arms 13 have formed therewith friction latches 25 so that the said levers 22 when swung into alignment with the arms 13 become frictionally latched therewith.

In the path of the downward swing of the arms 13 and suitably fitted on the truck A forwardly of the hood at each side thereof is a perpendicularly arranged rest 26 which limits the downward movement of the arms and allows the carrier 23 to be lowered into a loading position as is shown in Figure 1 of the drawings.

In the working of the device or attachment, when the carrier 23 is in the position shown in Figure 1 of the drawings, it can be readily loaded and thereafter the loaded carrier through activity of the windlasses or drums 18 by the cables 20 winding thereon will be raised upwardly and rearwardly over the cab B and by gravity swings into a dumping position for the loading of the body C of the truck A, the path of the carrier being indicated by the arrows in Figure 1 of said drawings. When the carrier has been emptied or dumped on further winding of the cables 20 upon the windlasses or drums 18, the levers 22 are brought to alignment with the arms 13 in their raised position and when the cables are slackened through overbalanced action, the carrier will be moved reversely or lowered forwardly of the truck and when the arms 13 engage the rests 26 the carrier becomes automatically unlatched from the arms 13 and will through its weight become lowered into position for acquiring a load.

Coiled about the stud pivots 12 and engaged with the arms 13 are tensioning springs 27 which serve to throw the arms in a forward direction past their pivotal axes for the lowering of the arms as before stated.

The use of the device or attachment allows the loading of the truck at the forward end thereof and automatic loading can be had with dispatch. The device or attachment also can function as a combined scraper and loader.

What is claimed is:

1. A loading attachment for motor vehicles having a chassis, comprising a vertically swinging frame supported at the fore end of the chassis, a pair of levers pivotally connected to opposite sides of said frame and swingable vertically to either side thereof, a load carrier supported by said levers, means operatively connected with the levers for swinging the same to either side of the said frame and also for raising and lowering said frame, guides on the frame and associated with said means, and means on the levers for frictionally latching the same with the frame in alignment therewith.

2. A loading attachment for motor vehicles having a chassis, comprising a vertically swinging frame supported at the fore end of the chassis, a pair of levers pivotally connected to opposite sides of said frame and swingable vertically to either side thereof, a load carrier supported by said levers, means operatively connected with the levers for swinging the same to either side of the said frame and also for raising and lowering said frame, guides on the frame and associated with said means, means on the levers for frictionally latching the same with the frame in alignment therewith, and means active upon the frame for effecting the lowering thereof from raised position.

3. A loading attachment for motor vehicles having a chassis, comprising a vertically swinging frame supported at the fore end of the chassis, a pair of levers pivotally connected to opposite sides of said frame and swingable vertically to either side thereof, a load carrier supported by said levers, means operatively connected with the levers for swinging the same to either side of the said frame and also for raising and lowering said frame, guides on the frame and associated with said means, means on the levers for frictionally latching the same with the frame in alignment therewith, means active upon the frame for effecting the lowering thereof from raised position, and means for supporting the frame when in a lowered position.

JAMES EDWARD OWEN.
GEORGE WALTER BRYSON.